(No Model.)  G. P. JUDD.  2 Sheets—Sheet 1.

GAS MACHINE.

No. 273,852. Patented Mar. 13, 1883.

Witnesses,
Geo. H. Strong.

Inventor
G. P. Judd
By Dewey & Co.
Attorneys (No Model.)

G. P. JUDD.
GAS MACHINE.

No. 273,852.  2 Sheets—Sheet 2.

Patented Mar. 13, 1883.

Witnesses:
Geo. H. Strong.
J. Strong

Inventor
G. P. Judd
By Dewey & Co.
Attorneys

UNITED STATES PATENT OFFICE.

GARRITT P. JUDD, OF SAN FRANCISCO, CALIFORNIA, ASSIGNOR TO HENRY PHILLIPS, OF SAME PLACE.

GAS-MACHINE.

SPECIFICATION forming part of Letters Patent No. 273,852, dated March 13, 1883.

Application filed November 13, 1882. (No model.)

*To all whom it may concern:*

Be it known that I, GARRITT P. JUDD, of the city and county of San Francisco, State of California, have invented an Improved Gas-Machine; and I hereby declare the following to be a full, clear, and exact description thereof.

My invention relates to certain improvements in that class of apparatus in which gas is produced from naphtha, gasoline, and similar substances for lighting or heating purposes; and it consists in novel features of construction and combination of parts, all as will be hereinafter fully described, and set forth in the claims hereto annexed.

Figure 1:
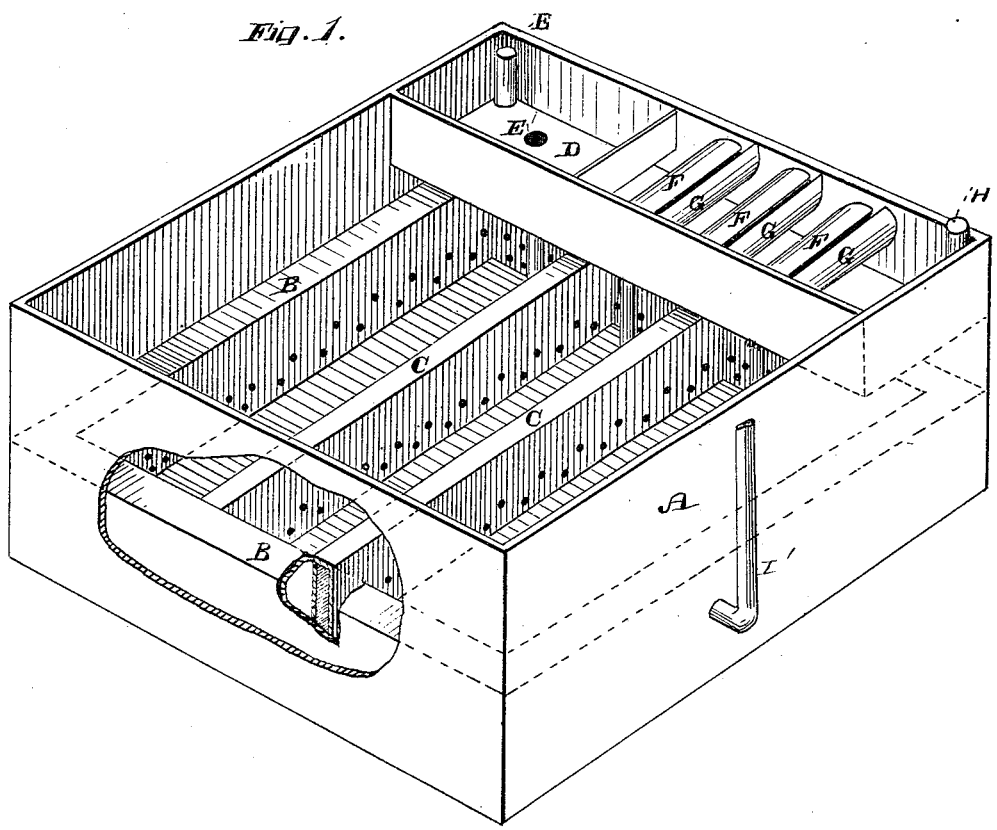
Figure 2:
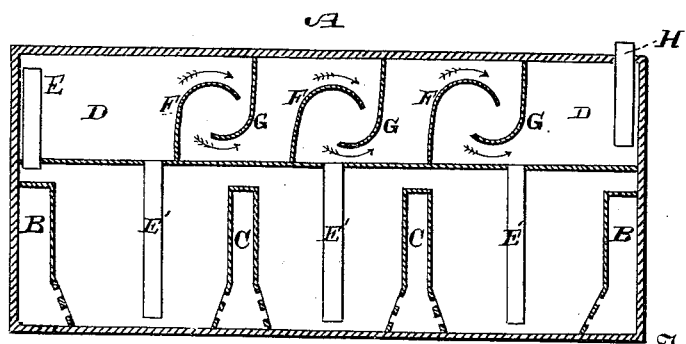
Figure 3:
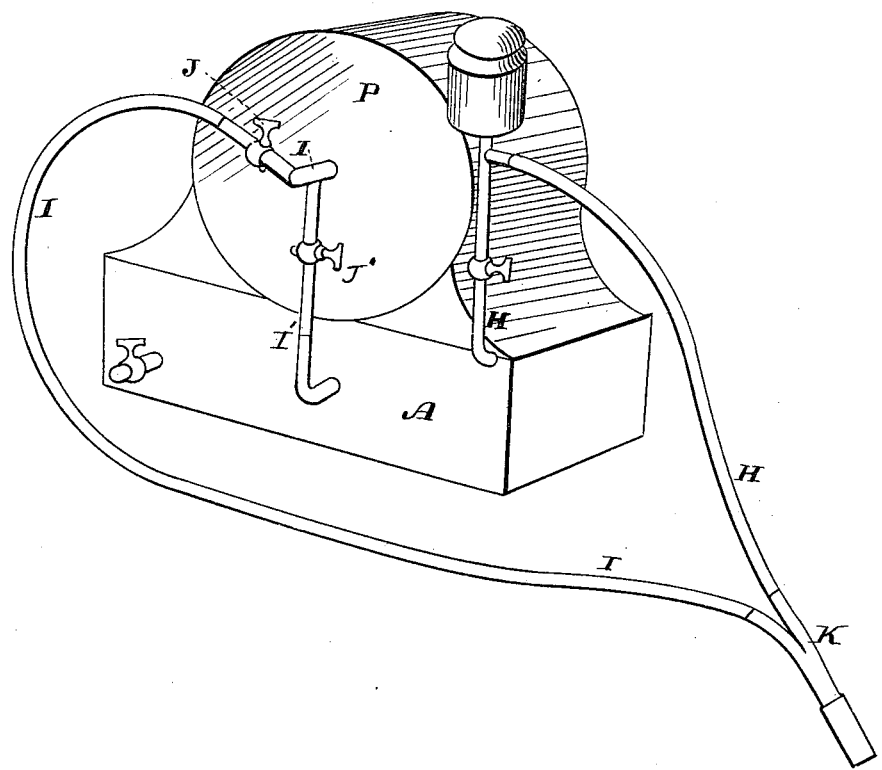

Referring to the accompanying drawings for a more complete explanation of my invention, Figure 1 is a view of the interior of the chamber. Fig. 2 is a transverse section. Fig. 3 is an exterior view.

In the present case I have shown a rotary pump, P, of simple well-known form mounted upon the top of the gas-chamber, which may be done in small machines to make them compact, but in large machines the two may be separate and of any suitable design.

A is a receiver, into which gasoline, naphtha, or any similar hydrocarbon which is easily vaporized may be placed in sufficient quantity. Around the walls of this receiver, near the bottom, is formed a narrow chamber, B, which has a tight upper portion, while the lower part may be made foraminous for the escape of air from the interior of the chamber into and through the liquid. Transverse hollow partitions C extend across the reservoir connecting with the chamber B, so that the whole is traversed by these air-passages, and the air is forced through every part of the liquid, and is thoroughly impregnated with the vapor through the medium of pump P and pipe I', (controlled by cock J',) connecting pump with chamber B, as shown in Fig. 3. At one side of the reservoir, and above the surface of the liquid, is the condensing or drying compartment D, into which the gas rises through a pipe, E, at one end. A number of curved partitions, F, extend across the compartment at intervals, being secured so as to be tight at the bottom and ends, while the upper edges curve over, as shown. Similar partitions, G, are secured to the top of the compartment, and form curves, which interlock with the curves of the partition without touching them, so that the gas must pass over the partitions F backward and downward between them and the partitions G, and thence beneath these partitions and forward to the next, until all have been passed, when the surplus liquid which may have been carried up with the gas will have been condensed, and the gas escapes through the pipe H, and either is conveyed to the burners or to a gas-meter, from which it is led to the burners. A pipe, I, is connected with the pump, and air is admitted into said pipe from the pump, and controlled by a cock, J. The two pipes H and I unite in a common discharge-nozzle, K, and the proportion of each admitted to the burner may be regulated by cocks, the flame being thus adjusted, as desired.

E' are tubes for conveying the surplus liquid from condenser D back into receiver A.

Having thus described my invention, what I claim as new, and desire to secure by Letters Patent, is—

In a gas-machine, and in combination with receiver A, provided with the foraminous chambers B C, the condenser D, with the curved partitions F G, and the inlet and discharge passages E and H, the air-pump P, pipe I', connecting pump with chamber B, and independent pipe I, connecting pump with the discharge-nozzle, substantially as herein shown and described.

In witness whereof I have hereunto set my hand.

GARRITT P. JUDD.

Witnesses:
 GEO. H. STRONG,
 S. H. NOURSE.